US012644307B2

(12) United States Patent
Green

(10) Patent No.: US 12,644,307 B2
(45) Date of Patent: Jun. 2, 2026

(54) LOCKING MECHANISM

(71) Applicant: Henry Squire & Sons Holdings Ltd, Wolverhampton (GB)

(72) Inventor: Glyn Green, Ratlinghope (GB)

(73) Assignee: Henry Squire & Sons Holdings Ltd (GB)

( * ) Notice: Subject to any disclaimer, the term of this patent is extended or adjusted under 35 U.S.C. 154(b) by 137 days.

(21) Appl. No.: 18/019,285

(22) PCT Filed: Jul. 13, 2021

(86) PCT No.: PCT/GB2021/051796
§ 371 (c)(1),
(2) Date: Feb. 2, 2023

(87) PCT Pub. No.: WO2022/043651
PCT Pub. Date: Mar. 3, 2022

(65) Prior Publication Data
US 2023/0304321 A1 Sep. 28, 2023

(30) Foreign Application Priority Data
Aug. 25, 2020 (GB) ..................................... 2013275

(51) Int. Cl.
*E05B 27/00* (2006.01)
*E05B 67/00* (2006.01)
*E05B 71/00* (2006.01)

(52) U.S. Cl.
CPC ........ *E05B 27/0028* (2013.01); *E05B 67/003* (2013.01); *E05B 71/00* (2013.01)

(58) Field of Classification Search
CPC ..... E05B 27/0028; E05B 67/003; E05B 71/00
USPC ........................................................... 70/348
See application file for complete search history.

(56) References Cited

U.S. PATENT DOCUMENTS 2,480,481 A * 8/1949 Kelly .................. E05B 27/0028 109/51
4,481,798 A * 11/1984 Inada ...................... E05B 35/00 70/349
4,754,630 A * 7/1988 Kawakami ............ E05B 35/007 70/378

(Continued)

FOREIGN PATENT DOCUMENTS

EP 2960406 A1 * 12/2015 ......... E05B 27/0028
FR 898459 A * 4/1945 ......... E05B 27/0028

(Continued)

*Primary Examiner* — Kristina R Fulton
*Assistant Examiner* — James Edward Ignaczewski
(74) *Attorney, Agent, or Firm* — The Belles Group, P.C.

(57) ABSTRACT

A lock mechanism is disclosed. The lock mechanism includes a body and a clasp with a hole in. The clasp engages and locks with the body. There is also a key receiver with a keyway and a latch biased in a first direction by a spring. The latch has a protrusion for engaging the aperture to lock the clasp to the body. There are split pins which straddle a shear line between the latch and key receiver when in a locked condition and that do not straddle the shear line when the correct key is in the keyway. The split pins are biased by springs in a second direction, transverse to said first direction. The lock mechanism also has a retainer for maintaining the engagement of the latch and the key receiver.

13 Claims, 2 Drawing Sheets

(56) References Cited

U.S. PATENT DOCUMENTS

| | | | | |
|---|---|---|---|---|
| 5,375,443 | A * | 12/1994 | Tamura | E05B 27/0028 70/378 |
| 2012/0042701 | A1 * | 2/2012 | Mah | E05B 67/22 70/344 |
| 2012/0160000 | A1 * | 6/2012 | Avganim | E05B 27/0028 70/348 |
| 2016/0017636 | A1 * | 1/2016 | Charley | E05B 47/0044 70/276 |

FOREIGN PATENT DOCUMENTS

| | | | | |
|---|---|---|---|---|
| FR | 1018102 | A | 12/1952 | |
| FR | 1196802 | A | 11/1959 | |
| GB | 1389901 | A | 4/1975 | |
| JP | 60174765 | U | 11/1985 | |
| WO | WO-8911576 | A * | 11/1989 | E05B 35/007 |
| WO | WO-2010143178 | A1 * | 12/2010 | E05B 27/0028 |

* cited by examiner

LOCKING MECHANISM

CROSS-REFERENCE TO RELATED PATENT APPLICATIONS

The present application is a U.S. national stage application under 35 U.S.C. § 371 of PCT Application No. PCT/GB2021/051796 filed Jul. 13, 2021, which claims priority to United Kingdom Patent Application No. 2013275.9 filed Aug. 25, 2020. The disclosures of the aforementioned priority applications are incorporated herein by reference in their entireties.

The present invention relates to a locking mechanism and relates particularly, but not exclusively to a locking mechanism for use when straps or belts are required to secure a device or object.

Belt and strap locks are widely used for security of objects such as bikes to a bike rack or in a shed. They are generally light weight and can be stored in the users back pack while not in use. The locking mechanism used for these locks is mainly a cylinder style lock. These types of locks have two main rotating parts, the key and the cylinder, which rotate relative to each other. Having rotational metallic parts however can become problematic with over use outdoors.

When a cyclist is away from home they often have no choice but to lock their bikes outside instead of using a shed or indoor area. With the strap lock being used to secure the bike it is also being left outdoors. Over time rain can cause rusting within and around the locking cylinder. When the key is inserted and turned the rust can prevent the cylinder from being turned with ease. This would cause the user to apply more force to the key when trying to unlock the bike lock. When the rusting increases this can further damage the cylinder leading to the cylinder to seize and completely stop working. The user may try to increase the force to turn the cylinder causing the key to snap. Either scenario would prevent the user from unlocking their bike, with the only option to cut through the straps.

With the general public having a larger concern for pollution and carbon emissions more people are using bikes to travel to work. Therefore having a lock to secure a bike that does not include rotating parts can be much more advantageous and less likely to cause problems when left out in the rain.

Preferred embodiments of the present invention seek to overcome or alleviate the above described disadvantages of the prior art.

According to an aspect of the present invention there is provided a lock mechanism comprising:— a body and a clasp having an aperture therein, the clasp engaging and locking with said body, the body comprising:

a key receiver having a keyway formed therein;

a latch biased in a first direction by a first biasing member, wherein a boundary between said latch and said key receiver defines a shear line and said latch has at least one protrusion for selectively engaging said aperture to maintain said clasp in locking engagement with said body;

at least one pin for movement between a locked condition, wherein said pin straddles said shear line and enters said keyway and an unlocked condition wherein said pin does not straddle said shear line wherein said pin is biased in a second direction, transverse to said first direction, by a second biasing member; and a retainer for maintaining the engagement of the latch and the key receiver.

Unlike the cylinder lock this lock mechanism does not include any rotating parts. With the key inserted along the first direction into the key receiver, a downwards force is applied to the protrusion that moves the pins in a second direction transverse to first direction. In the event of rust these lateral and longitudinal movements, will not have the same complications as those compared to rotational movements. As the key does not need to rotate, less force is applied and therefore there is less risk of the key snapping or the latch seizing.

In a preferred embodiment a housing is included for containing the body and the clasp.

The housing gives extra protection to the body and clasp against weather ailments and tampering by thieves.

In another preferred embodiment wherein the clasp comprises a tongue and a connecting portion wherein said tongue has at least one aperture which receives said protrusion extending from said latch.

In a further preferred embodiment a pushing member is used to control the position of said latch between the locked condition and unlocked condition;

The use of the pushing member negates the need to push on the key and as such prevents wear and possible breakage of the key.

In a preferred embodiment said first and second biasing member is a spring.

In another preferred embodiment said tongue is a bolt and extends past said key retainer into a secured position.

Preferred embodiments of the present invention will now be described, by way of example only, and not in any limitative sense with reference to the accompanying drawings in which:—

Figure 1:
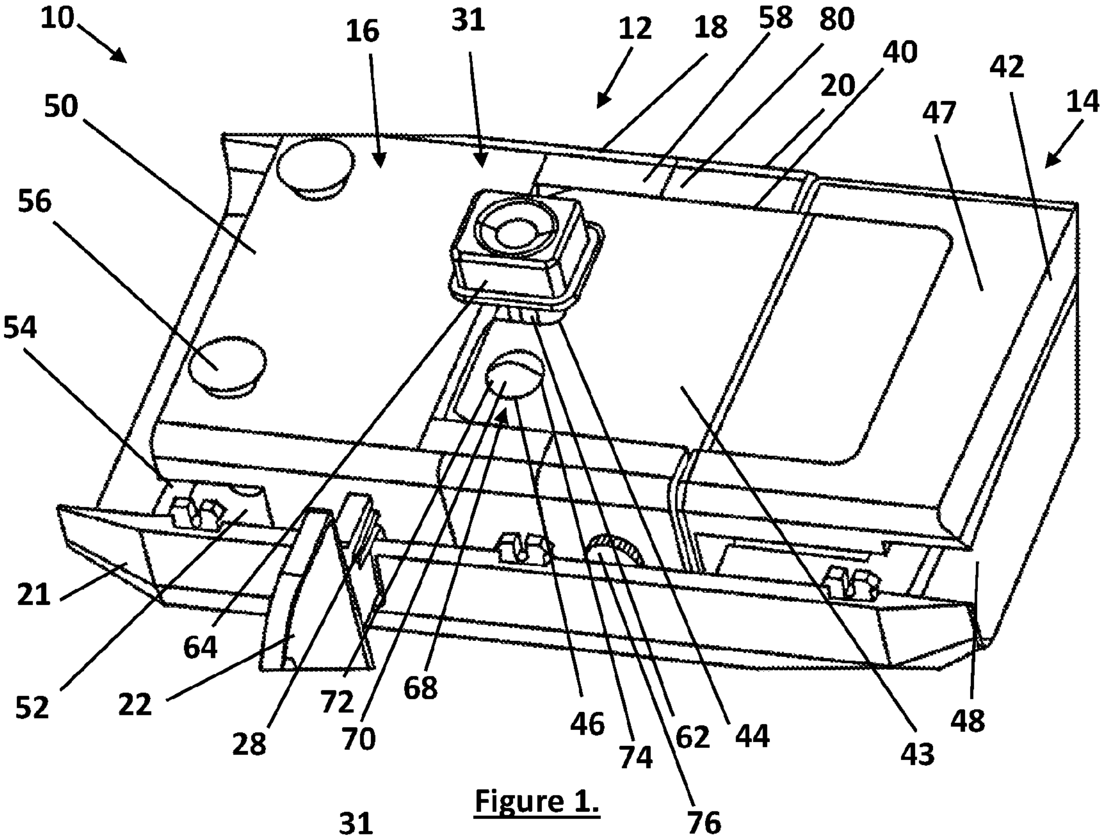
FIG. 1 is a perspective view of a locking mechanism of the present invention.
Figure 2:
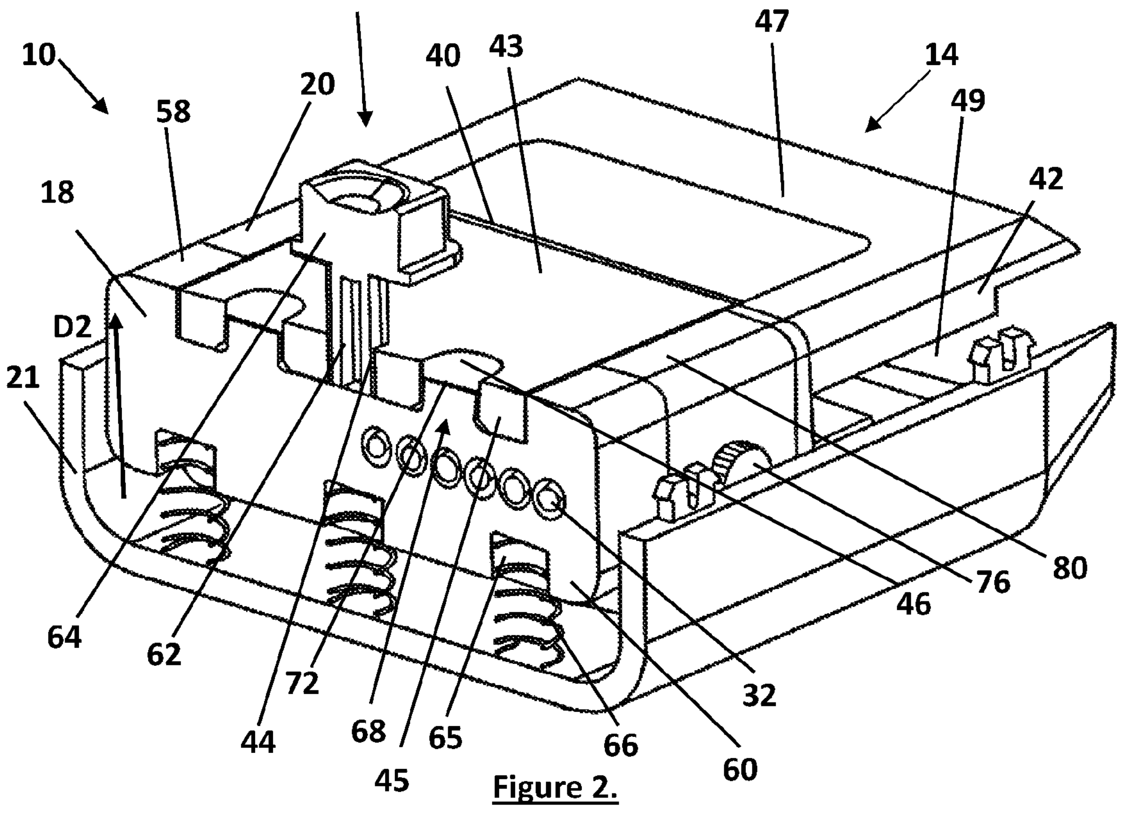
FIG. 2 is a sectional perspective view of the mechanism of FIG. 1.
Figure 3:
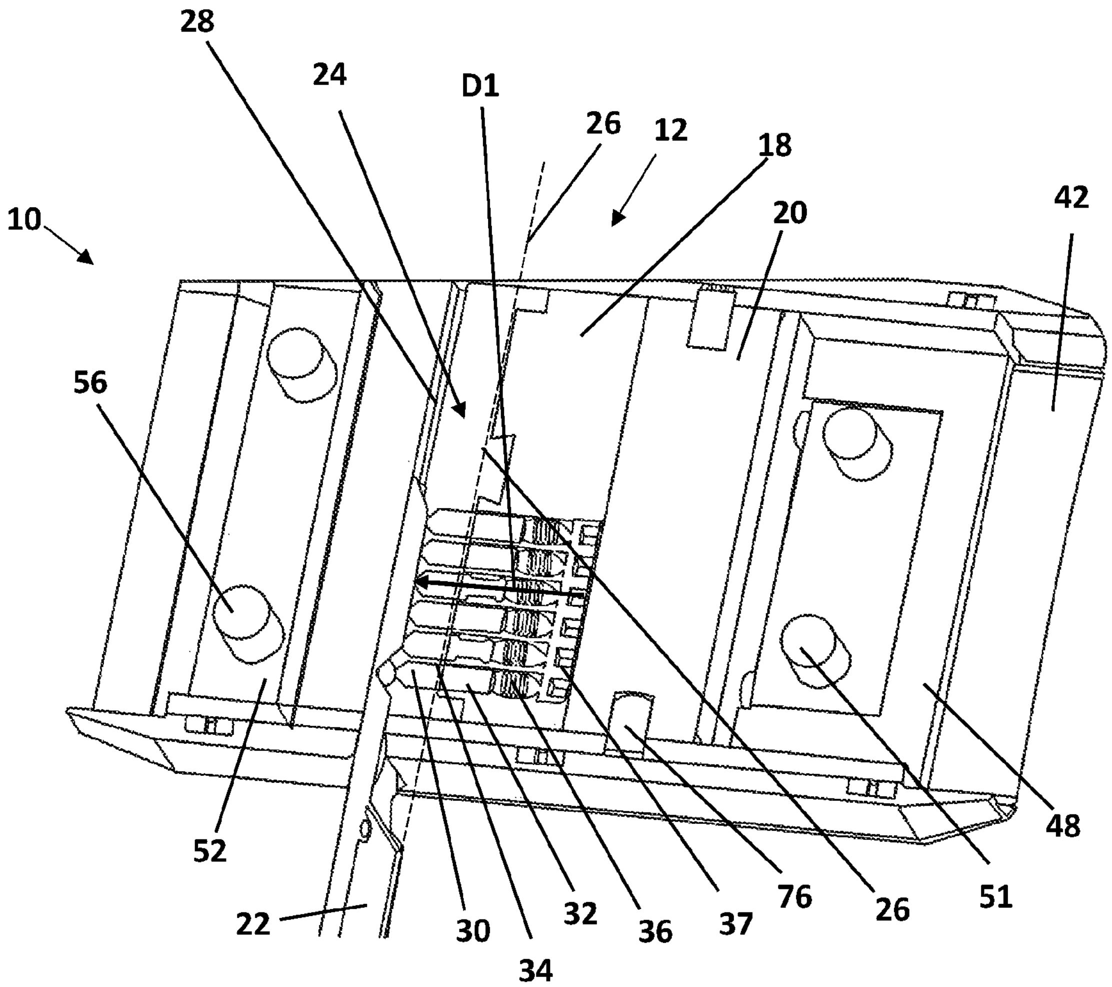
FIG. 3 is another sectional perspective view of the mechanism of FIG. 1.

Referring to FIGS. 1 to 3, a locking mechanism 10 includes a body 12 and a clasp 14, with the clasp 14 engaging the body 12 in a locked condition. The body 12 comprises three sections, a key receiver 16, a latch 18, and a retainer 20. The clasp 14 has two sections, a tongue 40 and a connecting portion 42. A housing 21 surrounds the body and the body 12 and clasp 14 are contained within a housing 21 when in the locked condition. In contrast when the locking mechanism 10 is in an unlocked condition the housing 21 only contains the body 12.

Removal of the clasp 14 from the body 12 is allowed or prevented depending on the position of a series of pins, in the form of split pins 24 and the release of the tongue 40. The split pins 24 are moved into the unlocked position by inserting an appropriate key 22 into a keyway in the form of an open port 28, located on the key receiver 16, and the mechanical pushing of a button 31, located on the latch 18, freeing the tongue 40.

The split pins 24 are located on a boundary between the key receiver 16 and the latch 18 which defines a shear line 26. The split pins 24 have a left portion 30 and right portion 32, with the right portion 32 adjacent a first biasing member in the form of a spring 36 which is located within the latch 18 and defines the left side of the locking mechanism 10. The left portion 30, being adjacent the open port 28 within the key receiver 16 and defines the left side of the locking mechanism 10. At least one of the split pins 24 has a left or right portion longer than the other split pins 24. The two portions 30 and 32 of the split pins create a coupling join 34 when together. The split pins 24 are biased towards the open port 28 by the springs 36 and in the locked condition the coupling join 34 on each of the split pins does not line up along the shear line 26. By straddling the shear line the right portion 32 in at least one of the split pins 24 prevents movement of the key receiver 16 relative to the latch 18. In this embodiment, the right pin portion 32 of the split pin 24 is the pin referred to in the claims and straddling or not straddling the shear line 26. When the key 22 is inserted into the open port 28 the split pins 24 engage with a contoured surface 23 of the key 22, the left portion 30 of the split pins 24 slot into the designated contours of the key 22 whilst the right portion 32 is biased towards the left portion 30 by the spring 36, creating the coupling joins 34. Due to the different heights within the contoured surface 23 of the key 22 the coupling joins 34 match up along the shear line allowing vertical movement of the latch 18.

Whilst one end of the spring 36 engages the split pin 24 the opposite end rests against a stopper 37. The stopper 37 adds a layer of protection for the first biasing members 36 and therefore prevents tampering with the split pins it also acts as a surface for the spring 36 to engage force against.

The key receiver 16 has a first top face 50 and first bottom face 52 with a first lateral opening 54 between the two faces on one side. This opening enables insertion of a strap or belt (not shown here). On the first top face 50 of the key receiver 16, along the same plane as the button 31 is at least one belt fixer 56, these are protrusions that extend from the bottom face 52, through the first lateral opening 54 and above the first top face 50. The belt fixers 56 can be removed leaving behind a plurality of apertures in the first top and bottom face 50 and 52 of the key receiver 16 and the strap can then be inserted into the first lateral opening 54. The strap (not shown here) has apertures comparable with the shape of the belt fixers 56. Once in place the belt fixers 56 slot through the apertures of the belt and the faces of the key receiver 16 with the belt fixers 56 further secured in place with a suitable cap.

The button 31 is located on a second top face 58 of the latch 18. The button 31 has a tail 62 and a head 64. When in a locked condition the tail 62 passes through a first recess 44 located on the tongue 40 and rests on the second top face 58 of the latch 18 whilst the head 64, being wider than the tail 62, extends above the second top face 58. If vertical pressure was applied to the button 31 at this stage, the latch 18 would remain stationary due to the coupling joins 34 of the split pins 24 not aligned, preventing any vertical movement.

Additional to the first recess 44, the tongue 40 has at least one aperture 46, allowing a protrusion 68 to enter. The protrusion 68 is located on the second top face 58 of the latch 18 and extends into the aperture 46 of the tongue when in a locked condition. The protrusion 68 has a top surface 70, a first edge 72 and second edge 74 wherein the height of the first edge 72 is larger than the second edge 74 creating a tapered top surface 70. Only the second edge 74 of the protrusion 68 engages with the edge of the aperture 46, this creates less friction around the edge of the aperture 46 allowing the button to be pressed down with ease. When pressure is applied to the button 31 in an unlocked condition, a downwards movement occurs in the latch 18, the protrusion 68 exits the aperture 46 and allows the tongue 40 to be removed, therefore freeing the clasp 14.

On the second bottom face 60 of the latch 18 at least one second recess 65 is positioned wherein a second biasing member in the form of a spring 66 engages with the second recess 65. The height of spring 66 in an extended condition is larger than the height of the second recess 65, such that the bottom of the spring 66 engages with the bottom of the housing 21. This enables a downward movement of the latch 18 towards the bottom of the locking mechanism when the button 31 is pressed. Once pressure is released from the button 31, the latch 18 is biased by the spring 66 in a second direction D2 towards the top of the locking mechanism 10 pushing the protrusion 68 back into the aperture 46 and securing the tongue 40. The second direction D2 of the movement of the latch 18 is at least transverse and preferably perpendicular to the first direction D1 of the movement of the split pins.

Providing an additional layer of support and safety is the retainer 20. This is positioned right of the latch 18 and is held in place by at least one securing member 76 perpendicular to the plane of the button 31. The retainer 20 has a third recess (not shown) on the third top face 80, wherein the tongue 40 is comparable in shape to the third recess and fits long the length of the third recess towards the protrusion 68 and the button 31, aligning with the second top face 58 of the latch 18. The retainer 20 also stops a person from gaining easy access the latch 18 when the clasp 14 is removed.

When engaged with the body 12, the clasp 14 is secured via the tongue 40. The tongue has a fourth top face 43 and a fourth bottom face 46 and extends linearly from a fifth top face 48 of the connecting portion 42, wherein the fourth bottom face 45 of the tongue lies along third and second top face of the retainer 20 and latch 18 respectively, 78 and 58. Along with the fifth top face 47, the connecting portion 42 also comprises a fifth bottom face 48 and a second lateral opening 49 between the fifth top face 47 and fifth bottom face 48. This second lateral opening 59 also enables insertion of a strap or belt (not shown here). FIG. 3 shows that the strap is secured with at least one second belt fixer 51 that extends through the fifth bottom face 48 into the second lateral opening 49. The strap engages with the second belt fixer 51 through an aperture on the belt corresponding with the shape of the and secured with a cap. A locking device is formed by the addition of a strap or belt to the locking mechanism 10. One end of the strap is inserted into the first lateral opening 54 of the key receiver 16 whilst the other end is inserted and secured into the second lateral opening 49 of the clasp 14 forming a closed loop when locked.

Operation of the locking mechanism will now be described. It should be noted that in FIGS. 1 and 2 the locking mechanism 10 is shown in a locked condition with the clasp 14 engaging the body 12. FIG. 3 shows the locking mechanism in an unlocked condition with the coupling joins 34 of the split pins 24 aligned with the shear line 26, allowing movement of the latch 18 and therefore release of the clasp 14.

An appropriate key 22 is inserted longitudinally into the open port 28 on the key receiver 16. The contoured surface 23 of the key 22 engages the left portion 30 of the split pins 24. The split pins 24 move laterally relative to the key 22 aligning each of the coupling joins with the shear line. The button 31 is pressed down with a vertical force which moves the latch 18 downwards, in turn moving the left portion 30 of the split pins down with the latch 18 leaving the right portion 32 of the pins inside the key receiver 16, this also moves the protrusion 68 downwards, exiting the aperture 46 on the tongue 40. The clasp 14 can then be released from the body 12 breaking the closed loop between the straps.

The key 22 can be removed from the open port 28 when the button 31 and latch 18 are depressed. The right portions 32 of the split pins 24 engage the surface of the key receiver 16 at the shear line 26. When the button 31 and latch are released latch 18 moves upwards and the left and right portions 30 and 32 of the split pins 24 engage one another so that the springs 36 bias the split pins towards the key receiver thereby causing the right portions 32 to once more straddle the shear line.

Because the latch 18 is unable to move relative to the key receiver 16 unless the correct key 22 is inserted into the open port 28 it is necessary to insert the key in order to engage the clasp 14 with the body 12. With the key 22 inserted the tapered top surface 70 of the protrusion 68 acts as a cam surface with the end of the tongue 40 pushing against that surface and causing the latch 18 to move down against the biasing force of spring 66. Once the clasp 14 is fully inserted into the body 12 the protrusions 68 are able to extend fully into the apertures 46 as the springs 66 puts the latch 18 up. When the key 22 has been removed from the open port 28 the locking device is locked.

It will be appreciated by persons skilled in the art that the above embodiments have been described by way of example only and not in any limitative sense and that various alterations and modifications are possible without departure from the scope of the protection which is defined by the appended claims. For example, other arrangements of the body 12 and clasp 14 are possible. By way of example the clasp 14 could be partially replaced by a sliding bolt mechanism, instead of using a tongue 40 that extended up to the key receiver 16 a bolt could be attached to the connecting portion 42 that would extend past the key receiver into an arch connected to the outside frame of a door. When in a locked condition the protrusions 68 on the latch 18 would engage apertures on the bolt surface keeping it secured. When in an unlocked condition the button 31 would be pressed releasing the protrusions 40 and allowing the bolt to slide out of the arch. A similar mechanism as such could also be used as a lock for a cabinet.

The above embodiment has been described with reference to a split pin 24 which straddles the shear line 26 and has a join 34 which when aligned with the shear line means that the device is in the unlocked condition. In an alternative embodiment the split pin can be replaced with an alternative pin arrangement which can include only a single pin rather than the pair of pin portions 30 and 32 which together form the split pin. For example, the left hand portion 30 of the pin could be replaced with a ball bearing or lozenge shaped pin leaving the right hand portion 32 of the pin in the form shown in FIG. 3 and therefore being the pin which either straddles or does not straddle the shear line.

In another example the belt or strap could be replaced with a chain and securing it to the connecting portion 42 with welds or hooks.

In a further example the button 31 could be replaced with a large aperture. A user would be able to use their finger to push down the latch 18 when in an unlocked condition.

The invention claimed is:

1. A lock mechanism comprising:

a body and a clasp having an aperture therein, the clasp engaging and locking with said body, the body comprising:

a key receiver having a keyway formed therein;

a latch biased by a first biasing member, said first biasing member acting in a first direction, wherein a shared boundary between said latch and said key receiver defines a shear line and said latch has at least one protrusion for selectively engaging said aperture to maintain said clasp in locking engagement with said body;

at least one pin for movement between a locked condition, wherein said pin straddles said shear line and enters said keyway and an unlocked condition wherein said pin does not straddle said shear line wherein said pin is biased in a second direction, transverse to said first direction, by a second biasing member; and a retainer for maintaining the engagement of the latch and the key receiver;

wherein the keyway receives the key in a third direction which is transverse to said second direction and said first direction; and wherein movement of the latch between the locked and unlocked condition is translational without rotation about a pivot.

2. The lock mechanism according to claim 1, further comprising a housing for containing the body and the clasp.

3. The lock mechanism according to claim 1, wherein said clasp comprises a tongue and a connecting portion wherein said tongue has at least one aperture which receives said protrusion extending from said latch.

4. The lock mechanism according to claim 1, wherein a pushing member is used to control the position of said latch between the locked condition and unlocked condition.

5. The lock mechanism according to claim 1, wherein said first and second biasing member is a spring.

6. The lock mechanism according to claim 1, wherein said tongue is a bolt and extends past said retainer into a secured position.

7. The lock mechanism according to claim 1, wherein said pin is a split pin.

8. A lock mechanism comprising:

a body and a clasp having an aperture therein, the clasp engaging and locking with said body, the body comprising:

a key receiver having a keyway formed therein;

a latch biased in a first direction by a first biasing member, wherein a shared boundary between said latch and said key receiver defines a shear line and said latch has at least one protrusion for selectively engaging said aperture to maintain said clasp in locking engagement with said body;

at least one pin for movement between a locked condition, wherein said pin straddles said shear line and enters said keyway and an unlocked condition wherein said pin does not straddle said shear line wherein said pin is biased in a second direction, transverse to said first direction, by a second biasing member; and a retainer for maintaining the engagement of the latch and the key receiver;

wherein said pin is a split pin;

wherein the keyway is configured to receive the key in a third linear direction that is substantially orthogonal to both said first linear direction and said second linear direction; and wherein movement of the latch between the locked and unlocked condition is translational without rotation about a pivot.

9. The lock mechanism according to claim 8, further comprising a housing for containing the body and the clasp.

10. The lock mechanism according to claim 8, wherein said clasp comprises a tongue and a connecting portion wherein said tongue has at least one aperture which receives said protrusion extending from said latch.

11. The lock mechanism according to claim 8, wherein a pushing member is used to control the position of said latch between the locked condition and unlocked condition.

12. The lock mechanism according to claim 8, wherein said first and second biasing member is a spring.

13. The lock mechanism according to claim 8, wherein said tongue is a bolt and extends past said retainer into a secured position.

* * * * *